(12) United States Patent
Nicholls et al.

(10) Patent No.: US 9,710,468 B2
(45) Date of Patent: Jul. 18, 2017

(54) TOPIC PROFILE QUERY CREATION

(71) Applicant: salesforce.com, inc., San Francisco, CA (US)

(72) Inventors: Christopher John Nicholls, Fredericton (CA); Christopher Shawn Collings, Fredericton (CA)

(73) Assignee: SALESFORCE.COM, INC., San Francisco, CA (US)

(*) Notice: Subject to any disclaimer, the term of this patent is extended or adjusted under 35 U.S.C. 154(b) by 299 days.

(21) Appl. No.: 14/477,210

(22) Filed: Sep. 4, 2014

(65) Prior Publication Data
US 2016/0070762 A1    Mar. 10, 2016

(51) Int. Cl.
*G06F 17/30* (2006.01)
*G06Q 50/00* (2012.01)

(52) U.S. Cl.
CPC .. *G06F 17/30017* (2013.01); *G06F 17/30035* (2013.01); *G06F 17/30616* (2013.01); *G06F 17/30654* (2013.01); *G06F 17/30702* (2013.01); *G06F 17/30864* (2013.01); *G06Q 50/01* (2013.01)

(58) Field of Classification Search
CPC ........ G06F 17/30864; G06F 17/30669; G06F 17/30867; G06F 17/3053; G06F 17/30929; G06F 17/30979
USPC ........ 707/749, 706, 765, 769, 771, 733, 734
See application file for complete search history.

(56) References Cited

U.S. PATENT DOCUMENTS

| | | | | |
|---|---|---|---|---|
| 6,947,930 | B2* | 9/2005 | Anick | G06F 17/30646 |
| 8,145,584 | B2* | 3/2012 | Juan | G06Q 10/10 705/319 |
| 8,289,364 | B2* | 10/2012 | Matsuda | H04N 7/142 348/14.04 |
| 8,832,132 | B1* | 9/2014 | Spertus | G06F 17/30669 707/765 |
| 9,251,217 | B2* | 2/2016 | Sinha | G06F 17/3053 |
| 9,275,149 | B2* | 3/2016 | Magill | G06F 17/30864 |
| 9,336,333 | B2* | 5/2016 | Blue | G06F 17/30864 |
| 9,477,782 | B2* | 10/2016 | Marantz | G06F 17/3097 |
| 2003/0014403 | A1* | 1/2003 | Chandrasekar | G06F 17/3064 |
| 2007/0250483 | A1* | 10/2007 | Blue | G06F 17/30864 |
| 2009/0049127 | A1* | 2/2009 | Juan | H04L 67/306 709/204 |
| 2009/0271374 | A1* | 10/2009 | Korn | G06F 17/30867 |
| 2011/0087686 | A1* | 4/2011 | Brewer | G06F 17/3064 707/766 |

(Continued)

Primary Examiner — Frantz Coby
(74) Attorney, Agent, or Firm — Morris & Kamlay LLP

(57) ABSTRACT

A topic profile may be generated based on several words/phrases. The topic profile may include social media content items such as a social media post from a variety of social media sources. The topic profile may be presented to a user via a user interface that displays the one or more included/excluded words/phrases that may form the basis of a query for the topic profile. The user interface may display one or more representative social media content items and/or a word cloud of words/phrases related to the query. A user may select one or more words/phrases in the word cloud and/or one or more social media content items to be included in and//or excluded from the topic profile. The implementations disclosed herein may allow rapid filtering of a potentially large group of content items from potentially disparate social media sources.

31 Claims, 5 Drawing Sheets

(56) References Cited

U.S. PATENT DOCUMENTS

| | | | |
|---|---|---|---|
| 2011/0137932 A1* | 6/2011 | Wable | G06F 17/30867 707/769 |
| 2012/0179637 A1* | 7/2012 | Juan | G06Q 10/10 706/45 |
| 2013/0031106 A1* | 1/2013 | Schechter | G06F 17/3064 707/749 |
| 2013/0185106 A1* | 7/2013 | Donatone | G06Q 50/01 705/7.14 |
| 2014/0156681 A1* | 6/2014 | Lee | G06F 17/30867 707/754 |
| 2014/0289322 A1* | 9/2014 | Gordon | H04L 67/104 709/203 |
| 2014/0358880 A1* | 12/2014 | Li | G06F 17/30864 707/706 |
| 2015/0032504 A1* | 1/2015 | Elango | G06Q 30/0201 705/7.29 |
| 2015/0286726 A1* | 10/2015 | Rush | G06F 17/30864 707/706 |
| 2015/0293997 A1* | 10/2015 | Smith | H04L 51/32 707/749 |

\* cited by examiner

| UNDO REDO CLEAR | | LOGOUT |

BUILD YOUR TOPIC  VIEW BY: ⊙ QUERY ○ INCLUDE / EXCLUDE

APPLE AND IPHONE AND ⊖ IPAD AND

220

260 → PHOTOS (19.7%)
SAMSUNG (16.2%)
WALL (12.2%)
APPLE (8.0%)
GOOD (5.8%)

☑ ALL SOURCES
☑ FACEBOOK
☑ TWITTER
☑ GOOGLE+
☑ LINKEDIN
☑ YOUTUBE

230

240

☑ ALL REGIONS
☑ NORTH AMERICA
☑ EUROPE
☑ ASIA
☑ AUSTRALIA
☑ AFRICA

250 → ☑ ALL LANGUAGES
☑ ENGLISH
☑ FRENCH
☑ SPANISH
☑ GERMANY
☑ ITALIAN

280

270

PREVIEW

JAPOCALDE CARLOS CALDERÓN
RT @MENDMYI IF YOU OWN AN APPLE PRODUCT RETWEET THIS NOW. #APPLE #IPHONE...

♡ NOV 1 10:47AM  ☆ FAVORITE  ▭ RETWEET  ↰ REPLY

XTREMETECHNO RONAK
IPHONE 5 WILL SAY 'NAMASTE INDIA' TOMORROW ; APPLE'S PARTNERS IN INDIA HAVE CONFIRMED THAT THE IPHONE 5 WILL BE... ENGT.CO/SQACBP

♡ NOV 1 10:37AM  ☆ FAVORITE  ▭ RETWEET  ↰ REPLY

IS CHILLY CONTACTING HOWEVER PRODUCTIVE
MARKET PLACE REVEAL OF APPLE MAC PCS IN THE U.S. REACHED EIGHT. 7%, EVEN IF THE IPAD PROFITS ARE NOT ACCOUNTED. INCORRECT GOAL - IT WOULD BE SUPERIOR, OF COURSE, IF PROSPECTS UTILISED FOR COLD CALLS WERE BEING VERY CAREFULLY CHOSEN, BUT IN MOST CIRCUMSTANCES, THEY AREN'T. FOR THAT MOTIVE, YOU COULD BE...

USER SETUP & ADMIN    SALESFORCE MARKETING CLOUD

TOPIC PROFILE QUERY CREATION

BACKGROUND

Some web browser search engines attempt to guess what a user is searching for as a user enters a keyword. For example, in response to a query such as "How do I" the search engine may make suggestions based on the user's search history, a user profile, and/or the most popular searches associated with the query. A web search engine may be directed toward efficiently locating content for a user utilizing as few of search terms as possible. For example, a conventional web search engine may receive a single word or phrase as a query and return a top ten list as a result. A user may typically select one of the first results shown on the first page. This approach may not be suitable for a business seeking to analyze its presence and response by users on social media websites.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 2 is an example of the user interface and a preview pane that may display representative social media content items as disclosed herein.

DETAILED DESCRIPTION

Figure 1:
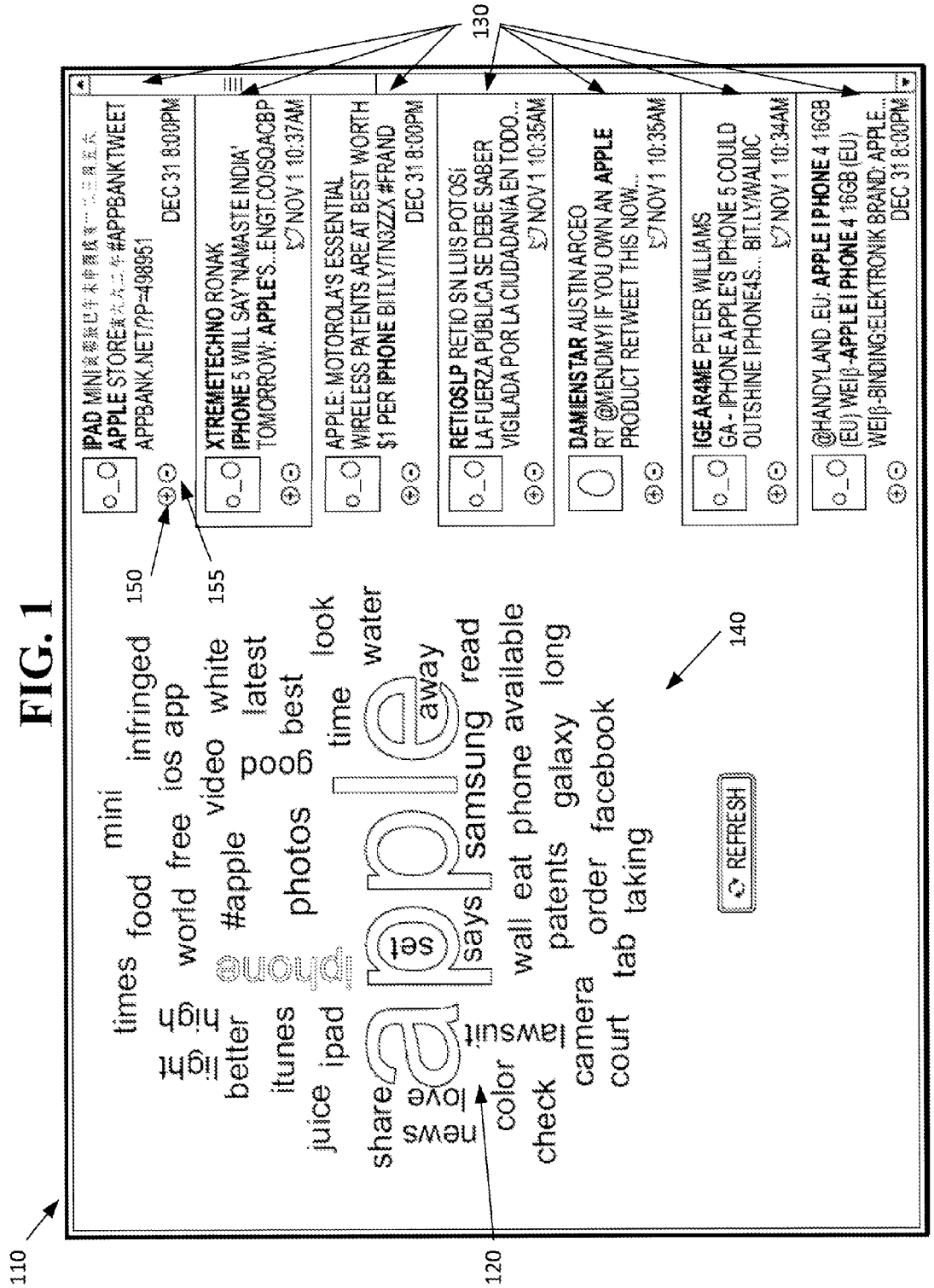
FIG. 1 is an example of a word cloud displayed via the user interface as disclosed herein.

An implementation of the disclosed invention can dynamically and iteratively generate and maintain a topic profile based on the detected frequency of keywords in social media posts. The keywords can be selected by a user to tailor the topic profile as desired. When a user selects a keyword, a new search of social media posts can be performed based on the selected keyword and new search results can be generated. A new set of keywords can be derived from the new search results and can be shown to the user for further review and selection. In this way, a user can iteratively build a focused set of keywords and search results to see how a given topic is being treated in social media posts.

Instead of experimenting with isolated search queries, a user may see what the most common and/or important terms are, add/remove them easily, and see the results in real time. Utilizing the disclosed system, a user can view one or more posts consistent with the topic profile as it evolves and may perform analytics on the matching posts. A topic profile may include, for example, hundreds or thousands of words/phrases, and at least some content from one or more social media content items that correspond to the words/phrases that are both selected and/or related to the selected words/phrases. The topic profile may become more complex over time. A topic profile may be generated by first receiving a keyword such as a company name or a brand name. The system may return a word cloud that may represent the most common words/phrases found in the social media content items that are returned in response to the query. A user may then select words from the word cloud to include and/or exclude. As words are added/excluded, a user may receive a preview of specific posts that will be matched by the current topic profile. The user could simply click "like" and "dislike" buttons on the specific posts and, in response, the system may add and/or remove relevant words to or from topic profile. A clustering algorithm may be applied to social media content items matching the topic profile to cluster each of the content items (e.g., posts). One post may be selected to represent the each cluster and presented as a preview for the user. A user may then add and/or remove a post. One or more words/phrases that are not currently selected by the topic profile but that are determined to be frequent within the cluster represented by a liked post may be added to the topic profile or presented to the user as words to be included in the topic profile.

In some instances, a business may wish to manage content, such as that provided by social media sites, that mentions the business or products and/or services provided by the business. As disclosed herein, a query utilizing a single word or phrase may be utilized to generate a word cloud with the most commonly associated words and phrases related to the original single word or phrase. The size of the word or phrase shown in the word cloud may indicate how related the word or phrase is to the original query and/or how frequently the word or phrase is contained in the same body of text as the original query. For example, a user may query social media posts for the word "Salesforce" and the system may display words related to "Salesforce" to the user in a word cloud. Common words such as "the," "a," "and," etc. may be filtered out from the word cloud. One of the more prominent phrases in the word cloud may be "cloud computing" that, upon the word selecting the phrase causes the word cloud to be updated to include "Salesforce" and "cloud computing." Thus, a topic profile may be generated that may include thousands of words, some of which a user has directed to be included in the search. Similarly, the topic profile may exclude words for which an instruction has been received to be excluded. The user interface may show one or more of the word cloud corresponding to the topic profile and social media posts related to the topic profile. Continuing the previous example, a social media post may be shown that includes the word "Salesforce" and the phrase "cloud computing in close proximity thereto. This may provide a business, for example, with the ability to filter through a large volume database of social media content items to obtain a specific topic profile and the resultant social media posts from the topic profile may be separately analyzed for their respective features (e.g., the demographics of the users).

An example of a word cloud display via a user interface is provided in FIG. 1. The initial query may be for the word "Apple" as shown in FIG. 1. The user interface 110 may display only the most relevant and/or frequent words related to the original query, "Apple" 120 For example, the word "computer" may not be shown in the example word cloud because it is below a threshold frequency for the available social media content items. Social media content items may refer to, for example, a social media post, a website, an article, a blog, a picture, a video, etc. Typically, in a social media website a user is connected through an online interface to one or more friends or businesses, thereby enabling the user to share content items with the one or more friends and/or businesses. As shown in FIG. 1, the user interface 110 may display social media content items (e.g., posts) 130 in addition to the word cloud 140. The posts 130 shown in the user interface 110 may reflect examples of posts 130 containing the words in the word cloud 140. Social media content items may be selected for display in the user interface based on relevancy, random selection, frequency of the appearance of words deemed related to the original query, time of posting, location, popularity of the user posting, etc. For example, the prevalence of selected keywords in the social media content items may be determined and the selected keywords may be ranked according to their frequency. That is, if the keywords are AAA, BBB, CCC, and DDD, the frequency of those four words in a single post among all of the social media sources may be 2%. The frequency for AAA, BBB, and CCC may be 20% and AAA, CCC, and DDD may be 10%. Although the posts containing the four keywords are rarer than those containing three keywords, the four keyword-containing posts may be selected for presentation in the user interface because they contain all of the words.

In the example provided in FIG. 1, each social media content item 130 also shows a "+" 150 and a "−" 155 symbol which may have configurable functions. In some instances, a user may include a post by selecting the "+" 150 symbol or exclude a post by selecting the "−" 155 symbol. By electing to include a social media content item, the system may include any of the words in the post that are also represented in the word cloud. In some configurations, selecting the "+" 150 button may cause the system to save the post so that a user may return to it later. Selecting the "−" 155 button may remove the post from the user interface. The system may alter the user interface to replace the post with another social media content item (e.g., another post in this example). The system may receive a selection of one or more of the words in the word cloud and update the word cloud and/or the social media content items displayed once the "refresh" button is selected.

A user may elect to save the topic profile that is generated by the inclusion/exclusion of one or more words relative to the query and/or social media content items. For example, in FIG. 2, the user interface 210 shows an indication of the topic profile that is based on a query 220 that includes the words "APPLE," "IPHONE," and "IPAD". The user interface 210 may display to the user a variety of controls with which a user may modify the topic profile. For example, the user interface 210 may provide a selectable list of social media sources 230, a region 240, and/or a language 250. Data indicating the most prevalent words/phrases associated with the query may be displayed 260. As shown in FIG. 2, each word/phrase 260 may be accompanied by an indication of its frequency based on words/phrases included in the query. A user may modify the query 220 by including/excluding terms and the user interface 210 may be dynamically updated. For example, as a user adds or removes keywords from the topic profile to form a modified query, the system may query the database and regenerate a word cloud and/or an indication of the most related and/or frequent words based on the modified query. The user interface may be updated to reflect the results of the modified query such as displaying social media content items that are returned as a result of the modified query, displaying an updated word cloud, and/or displaying an updated list of suggested words/phrases that are related and/or frequent among the social media content items returned based on the modified query.

The user interface may display posts 270 corresponding to the topic profile. Posts 270 may be presented from one or more social media sources 230 and each of the social media sources 230 may have a distinct post type. For example, one social media source may limit a user to a certain number of characters while another social media source may allow a user to include photos and/or videos in addition to text in a post. In some configurations the topic profile shown in the user interface may show all social media content items associated with the query selected. For example, in the preview pane shown in FIG. 2, social media posts are shown for the selected query and filter options.

In some instances a representative post of a group of posts may be selected to be included in the topic profile. A clustering or machine learning algorithm may be applied to the group of posts to ascertain the most frequent words/phrases in the group of posts. The user interface, for example, may update a word cloud to reflect the most frequent words/phrases. Posts may be clustered using known multi-objective optimization techniques such as connectivity-based clustering (hierarchical clustering), centroid-based clustering, distribution-based clustering, intensity-based clustering, etc. For example, in centroid-based clustering (also known as k-means clustering), k cluster centers may be found and each post can be assigned to the nearest cluster center so that the square distances to the cluster are minimized. As another example, a topic profile may be based on words Apple, iPhone, and iPad. The word cloud may indicate that the most frequently found words/phrases in the social media content items returned by the topic profile are photos, Samsung, and camera. A user may select a representative post of a group of posts for the word represented by photos to be included in the topic profile. The word cloud may be updated to indicate that the most frequently represented words/phrases are, in order of the most frequent to least frequent, resolution, focal length, megapixel, and camera. Thus, the system may rapidly generate a topic profile with relevant words/phrases based on the clustering of social media content items. A new topic cloud may be generated and saved based on the selected word/phrases and/or social media sources.

Implementations disclosed herein may provide a quick response of real-time data. For example, the time frame for which social media content items may be retrieved and/or queried may be limited to a three hour period, such as the most recent three hour period or a given three hour period in the past. Limiting the time frame to a narrow window (e.g., less than a twenty four hour period of time) may permit the database to quickly provide a response to a user query. Limiting the period of time can reduce the number of content items that the system must search or analyze. It can also be used to ensure that stale or out of date content items are not used to generate the topic profile, modify the word cloud, etc. The time frame may be specified using a time frame threshold. When a user switches from one social media source to a second social media source, the database can quickly retrieve and display the results of the query in the user interface.

Figure 3:
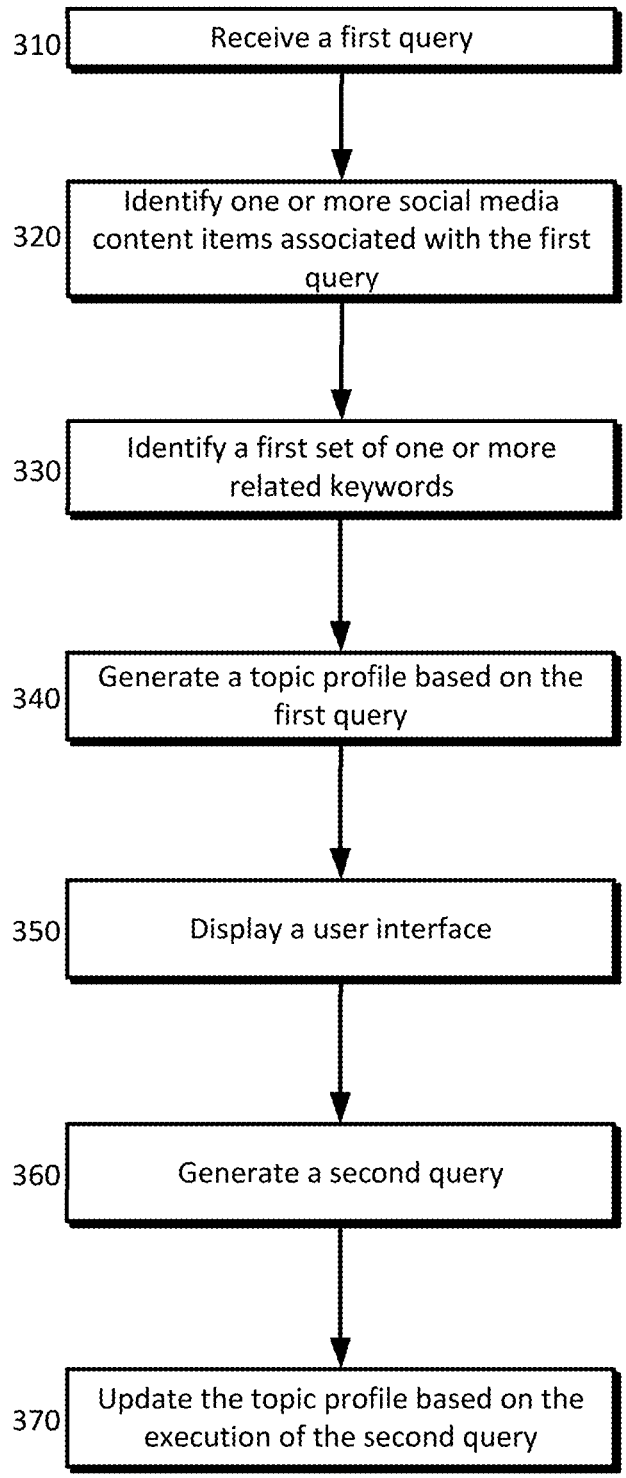
FIG. 3 is an example process for generating and/or updating a topic profile.

In an implementation, an example of which is provided in FIG. 3, a first query may be received at 310. The query may be received in the form of a single word or phrase such as a brand name. One or more social media content items associated with the first query may be identified at 320. A social media content item may refer to, for example, a website, an article, a blog, and a social media post. The social media content item may include one or more images, audio, video, and/or metadata. The query may be received by a processor connected to one or more databases on which the social media content items are stored. The query may be submitted via a user interface operating on a client computer operated by the user. One or more words may be identified as matching and/or being related to the query at 330. Each word that is identified as matching or being related to the query may be contained in each of the social media content items. For example, a query shown in FIG. 2 may be "Apple" and related words may be reflected in a word cloud such as "phone" or "iPad."

A topic profile may be generated based on the query at 340. The topic profile may include the query, one or more social media content items associated with the query (e.g., social media posts). A user interface may be displayed at 350 and may include a word cloud as described above and shown in the example provided in FIG. 1. The word cloud may show only a portion of the total words identified at 330 as being related and/or matching the query. Words may be selected for display because they appear at a frequency above a threshold value. The threshold value may be based on the configuration of the user interface. For example, the user interface may be configured to have a specified area within which it may display words related to the query. If the number of related words identified at 330 exceeds the available area of the user interface, the user interface may not display a number of the least frequent words identified in the query such that the available area of the user interface is filled with the most frequently appearing words/phrases. Further, because the size of the words/phrases in the word cloud may vary based on the frequency and/or relation (e.g., how well matched) of the word to the query, the system may compute words to be displayed on the size of the words with respect to the word cloud. As described earlier, the user interface may include a portion of the social media content items corresponding to the words shown in the word cloud at 340. As described earlier, a clustering algorithm may be applied to the social media content items and a representative content item for each cluster may be selected for display in the user interface.

A selection of a word/phrase shown in the word cloud may be received at 350. The selection may be received by selecting a positive indicator that is shown on each word. For example, the user interface may show a "+" or "−" sign when a user hovers a mouse pointer over a word. If the user selects the "+" symbol, it may be received by the system as a positive indicator, that is, that the user would like to include the word in the topic profile and/or modify the user interface based on the topic profile with the included word. Conversely, if the user selects the "−" symbol, the topic profile may exclude the word. The inclusion/exclusion of one or more words/phrases may be reflected in the social media content items shown in the user interface. In some configurations, a user may select one or more words/phrases to be included in topic profile by selecting one of the social media content items. For example, a user may select a "+" symbol displayed on a social media post that is displayed as a representative post of a cluster of posts. The representative post may have one or more words/phrases that are highlighted as shown by the emboldened words in FIG. 2, for example. The emboldened words may reflect the words/phrases by which the cluster is represented. For example, the highlighted or otherwise indicated words may be those words that are most frequent in the cluster of posts. As another example, highlighted words/phrases may reflect those words that appear within a proximity of other related words. In one cluster, the words AAA, BBB, and CCC all may appear within ten words whereas in another cluster, the words AAA, BBB, and CCC all may appear within fifty words of one another. Thus, when a user elects to include the representative post, the topic profile may receive the positive indication as an instruction to include the highlighted words/phrases. A user may subsequently modify the topic profile to include and/or exclude one or more words.

A second query may be generated or received based on original query (e.g., the key word that initially formed the topic profile) and those words/phrases that were identified as being related thereto at 360. The second query may be received by the processor connected to one or more databases on which the social media content items are stored. The topic profile may be updated based on the result of executing the second query by the process at 370. Updating the topic profile may refer to identifying one or more social media content items associated with the second query. The resultant identified content items, or a representation thereof, may be displayed to in the user interface. The word cloud may be updated to reflect the updated topic profile.

At any stage of updating the topic profile, the resultant social media content items may be filtered by one or more attributes such as language, social media source, region, demographic, etc. Analytics may be generated for resultant social media content items returned as the topic profile is refined. For example, a topic profile may result in one hundred posts with three distinct clusters among the one hundred posts. For each cluster, a user may view the age, gender, frequency of the selected words/phrases in the posts, etc. In some configurations, a user may elect to view content items for the topic profile for a defined time frame. For example, a user may desire to view social media content items for every Monday in the month of July. Further, analytic data may be limited to a particular time frame.

Figure 4:
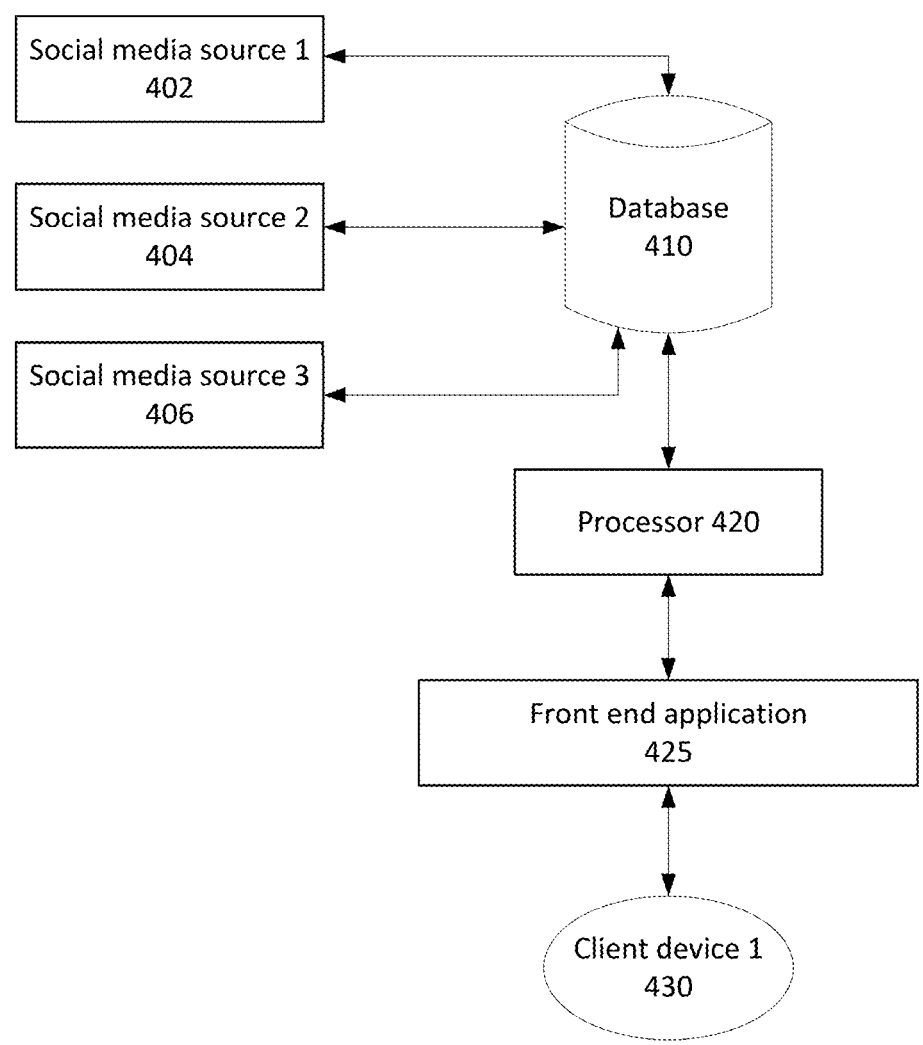
FIG. 4 is an example overview of a system that includes a database operationally coupled to a processor that can generate and update a topic profile as disclosed herein.

In an implementation, a system is disclosed that includes a database 410 for storing one or more social media content items. An example of the system is provided in FIG. 4. Social media content items may be provided, for example, by social media sources 402, 404, 406. In some configurations, the system may utilize a web crawler to obtain content media items. For example, a content aggregator site in which registered users post content (e.g., news articles or user generated content) may be fully accessible by a web crawler. During the ingestion of content media items, the data may be stored according to rules defined by an extensible mark-up language such as XML.

A processor may be communicatively coupled to the database. The processor 420 may be configured to receive a query from a client device 430 and identify related words/phrases to the query. The processor 420 may be configured to send the results of the query to a client computer 430. The client computer 430 may receive the search results by a user interface provided by an application 425 operating on the client computer 430. In some configurations, the user interface may be provided by a web page that may be hosted by the system. A user may make a selection of one or more content items and/or words/phrases that have been identified and provided in response to the query via the user interface. The selection may be received by the processor 420 and one or more social media content items. A topic profile may be generated by the processor 420 based on the query and it may include the one or more social media content items as described earlier. In some configurations, a snapshot of the one or more content items may be stored in the database 410. For example, the system may be configured to retrieve social media content items for a specific timeframe and a topic profile may be stored for each timeframe specified.

The processor 420 may be configured to update the topic profile based on a selection of one or more words/phrases and/or social media content items. A user may manually type in a word/phrase to be included in the topic profile, for example, if the word/phrase is not presented in the user profile.

The system disclosed herein may be implemented as a multi-tenant system. The system may include a server that can generate one or more virtual applications based on data stored in a common database shared between the tenants. Each virtual application may provide access to data in the database for each of the one or more tenants utilizing the system. A tenant may refer to a group of users that shares access to common data within a database. A tenant may represent customers, customer departments, business or legal organizations, and/or any other entities that maintain data for particular sets of users. A tenant may, for example, request social media posts, metadata, and/or analytics provider data. Although multiple tenants may share access to a common server and database, the particular data and services provided from the system to each tenant can be securely isolated from those provided to other tenants. The multi-tenant architecture therefore allows different sets of users to share functionality without necessarily sharing each other's data. Similarly, the appearance of each tenant's interface with the system may be unique.

The results provided in response to a search query may obtained in at least two distinct manners. In one configuration, for each word that is add and/or removed, the system may query the entire database of social media content items and update the topic profile accordingly. In a second configuration, the system may perform a hierarchical search in which the system may query the social media content items returned from a previous query. For example, a user may enter a search term such as "Apple." The system may return the most popular and relevant words as "iPhone," "iPad," and "camera." The total number of content items returned for the term "Apple" may be three million in the last twenty-four hours from among the total number of social media content items in the database. If the user elects to add "iPad" to the query, the system may query only the three million content items returned in the query for "Apple". This may, for example, yield five hundred thousand posts with "camera" being the most common and/or related term in those posts. If the user further adds the term "camera" to the query, the system may return one hundred thousand of the posts from the five hundred thousand that include both "Apple" and "iPad." If the user removes the term "iPad" from the query, the system may query the three million posts returned from that query. The result may be one and a half million posts, some of which (e.g., five hundred thousand) will contain the term "iPad." The most prevalent term, however, may be "iPhone." Thus, the order of the terms in topic profile may provide different subsets of data. Two topic profiles that contain the same search terms, but in different order may, therefore, result in different representations of social media content items.

Figure 5:
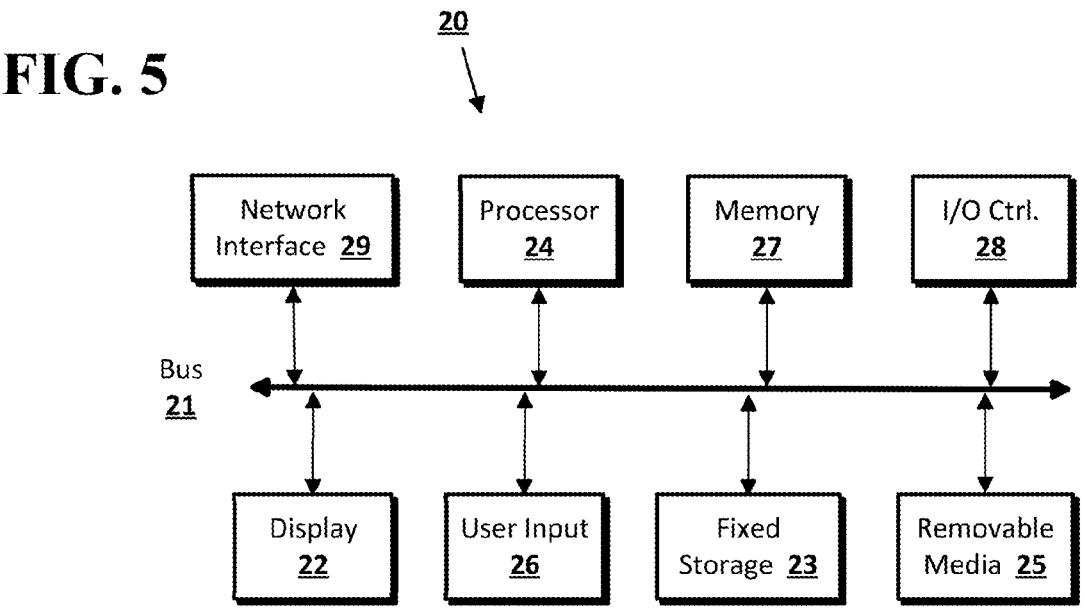
FIG. 5 shows a computer according to an implementation of the disclosed subject matter.

Implementations of the presently disclosed subject matter may be implemented in and used with a variety of component and network architectures. FIG. 5 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fiber Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an Internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
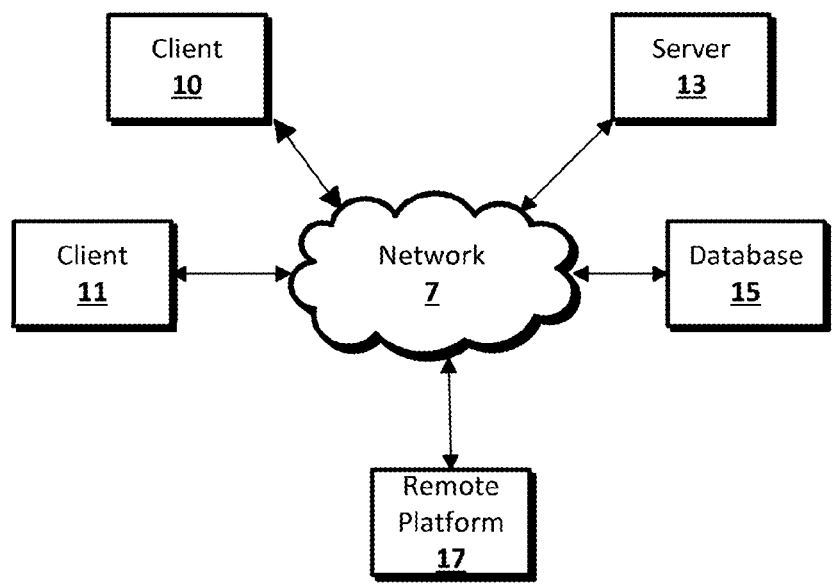
FIG. 6 shows a network configuration according to an implementation of the disclosed subject matter.

FIG. 6 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method for creating a topic profile comprising:
receiving a first query;
identifying a first plurality of social media content items associated with the first query, wherein the first plurality of social media content items are a result of executing the first query;
identifying, from among the first plurality of social media content items, a first set of one or more related keywords, wherein each keyword in the first set is referenced in at least one social media content item from among the plurality of social media content items;
generating a topic profile based on the first query, wherein the topic profile comprises the first query, the first plurality of social media content items, and the first set of one or more related keywords;
displaying a user interface comprising:
a word cloud based on the topic profile, wherein the word cloud comprises the first query and the first set of one or more related keywords, and
at least a portion of the first plurality of social media content items;
receiving, via the user interface, a selection of a first related keyword from among the first set of one or more related keywords displayed in the word cloud;
generating a second query based on the first query and the selected first related keyword;
executing the second query; and
updating the topic profile based upon a result of executing the second query.

2. The method of claim 1, wherein the second query is generated at least in part by adding the first related keyword to the second query based on the selection of the first related keyword.

3. The method of claim 1, wherein the second query is generated at least in part by removing the first related keyword from the topic profile based on the selection of the first related keyword.

4. The method of claim 1, wherein updating the topic profile based upon a result of executing the second query comprises:
identifying a second plurality of social media content items associated with the second query, wherein the second plurality of social media content items are a result of executing the second query; and
identifying, from among the second plurality of social media content items, a second set of one or more related keywords, wherein each keyword in the second set is referenced in at least one social media content item from among the second plurality of social media content items.

5. The method of claim 4, wherein updating the topic profile based upon a result of executing the second query further comprises updating the user interface comprising the word cloud based on the updated topic profile, wherein the word cloud comprises the second query and the second set of one or more related keywords.

6. The method of claim 4, wherein updating the topic profile based upon a result of executing the second query comprises displaying, in the user interface, at least a portion of the second plurality of social media content items.

7. The method of claim 1, further comprising receiving a selection of a first social media content item from among the at least a portion of the first plurality of social media content items displayed in the user interface and wherein generating a second query is further based on the selection of the first social media content item.

8. The method of claim 7, wherein the selection of the first social media content item indicates positive feedback associated with the first social media content item, and further comprising identifying one or more additional social media content items that are associated with the second query and that share a common attribute with the first social media content item.

9. The method of claim 8, further comprising identifying, from among the one or more additional social media content items, a second set of one or more related keywords, wherein each keyword in the second set is referenced in at least one social media content item from among the one or more additional social media content items, and wherein updating the topic profile based upon a result of executing the second query further comprises updating the word cloud based on the updated topic profile, wherein the word cloud further comprises the second set of one or more related keywords.

10. The method of claim 7, wherein the selection of the first social media content item indicates negative feedback associated with the first social media content item, and wherein updating the topic profile further comprises removing the first social media content item from the first plurality of social media content items.

11. The method of claim 10, further comprising updating the word cloud based on the updated topic profile and wherein one or more related keywords referenced in the first social media content item are removed from the word cloud.

12. The method of claim 1, further comprising automatically grouping similar social media content items among the first plurality of content items using text clustering, and wherein displaying at least a portion of the first plurality of content items comprises displaying a representative content item from each group of similar content items, wherein the representative content item represents a group of similar content items.

13. The method of claim 1, wherein a social media content item is selected from the group consisting of: a website, an article, a blog, and a social media post.

14. The method of claim 1, wherein the user interface further comprises one or more filters for filtering the first plurality of social media content items.

15. The method of claim 1, further comprising generating data analytics based on the topic profile.

16. A system for creating a topic profile comprising:
a database for storing a plurality of social media content items;
a processor communicatively coupled to the database, the processor configured to:
receive a first query;
identify, in the database, a first plurality of social media content items associated with the first query, wherein the first plurality of social media content items are a result of executing the first query;
identify, from among the first plurality of social media content items, a first set of one or more related keywords, wherein each keyword in the first set is referenced in at least one social media content item from among the plurality of social media content items;
generate a topic profile based on the first query, wherein the topic profile comprises the first query, the first plurality of social media content items, and the first set of one or more related keywords;
display, on a client computing device, a user interface comprising:
a word cloud based on the topic profile, wherein the word cloud comprises the first query and the first set of one or more related keywords, and
at least a portion of the first plurality of social media content items;
receive, via the user interface, a selection of a first related keyword from among the first set of one or more related keywords displayed in the word cloud;
generate a second query based on the first query and the first related keyword;
execute the second query; and
update the topic profile based upon a result of executing the second query.

17. The system of claim 16, wherein the second query is generated at least in part by adding the first related keyword to the second query based on the selection of the first related keyword.

18. The system of claim 16, wherein the second query is generated at least in part by removing the first related keyword from the topic profile based on the selection of the first related keyword.

19. The system of claim 16, wherein updating the topic profile based upon a result of executing the second query comprises:
identifying a second plurality of social media content items associated with the second query, wherein the second plurality of social media content items are a result of executing the second query; and
identifying, from among the second plurality of social media content items, a second set of one or more related keywords, wherein each keyword in the second set is referenced in at least one social media content item from among the second plurality of social media content items.

20. The system of claim 19, wherein updating the topic profile based upon a result of executing the second query further comprises updating the user interface comprising the word cloud based on the updated topic profile, wherein the word cloud comprises the second query and the second set of one or more related keywords.

21. The system of claim 19, wherein updating the topic profile based upon a result of executing the second query comprises displaying, in the user interface, at least a portion of the second plurality of social media content items.

22. The system of claim 16, further comprising receiving a selection of a first social media content item from among the at least a portion of the first plurality of social media content items displayed in the user interface and wherein generating a second query is further based on the first social media content item.

23. The system of claim 22, the processor further configured to identify one or more additional social media content items that are associated with the second query and that share a common attribute with the first social media content item.

24. The system of claim 23, the processor further configured to identify, from among the one or more additional social media content items, a second set of one or more related keywords,
wherein each keyword in the second set is referenced in at least one social media content item from among the one or more additional social media content items, and wherein updating the topic profile based upon a result of executing the second query further comprises updating the word cloud based on the updated topic profile, wherein the word cloud further comprises the second set of one or more related keywords.

25. The system of claim 22, wherein updating the topic profile further comprises removing the first social media content item from the first plurality of social media content items based on the selection of the first social media content item.

26. The system of claim 25, the processor further configured to update the word cloud based on the updated topic profile and wherein one or more related keywords referenced in the first social media content item are removed from the word cloud.

27. The system of claim 16, the processor further configured to automatically group similar social media content items among the first plurality of content items using text clustering, and wherein displaying at least a portion of the first plurality of content items comprises displaying a representative content item from each group of similar content items, wherein the representative content item represents a group of similar content items.

28. The system of claim 16, wherein a social media content item is selected from the group consisting of: a website, an article, a blog, and a social media post.

29. The system of claim 16, wherein the user interface further comprises one or more filters for filtering the first plurality of social media content items.

30. The system of claim 16, further comprising generating data analytics based on the topic profile.

31. A method for creating a topic profile comprising:
receiving a first query;
identifying a first plurality of social media content items associated with the first query, wherein the first plurality of social media content items are a result of executing the first query;
identifying, from among the first plurality of social media content items, a first set of one or more related keywords, wherein each keyword in the first set is referenced in at least one social media content item from among the plurality of social media content items;
generating a topic profile based on the first query, wherein the topic profile comprises the first query, the first plurality of social media content items, and the first set of one or more related keywords;
clustering the first plurality of social media content items to form a first plurality of clusters, wherein each of the first clusters contains at least one of the first social media content items;
determining, for each cluster, a collection of at least one word that represents each of the first clusters;
displaying a user interface comprising:
a word cloud based on the topic profile, wherein the word cloud comprises the first query and the first set of one or more related keywords, and at least a portion of the first plurality of social media content items, wherein one of the first plurality social media content item is selected for each of the first clusters for display in the user interface;
receiving a selection of a first of the plurality of social media content items;
generating a second query based on the first query and the collection of at least one word that is represented by the first of the plurality of social media content items;
executing the second query; and
updating the topic profile based upon a result of executing the second query.

* * * * *